UNITED STATES PATENT OFFICE.

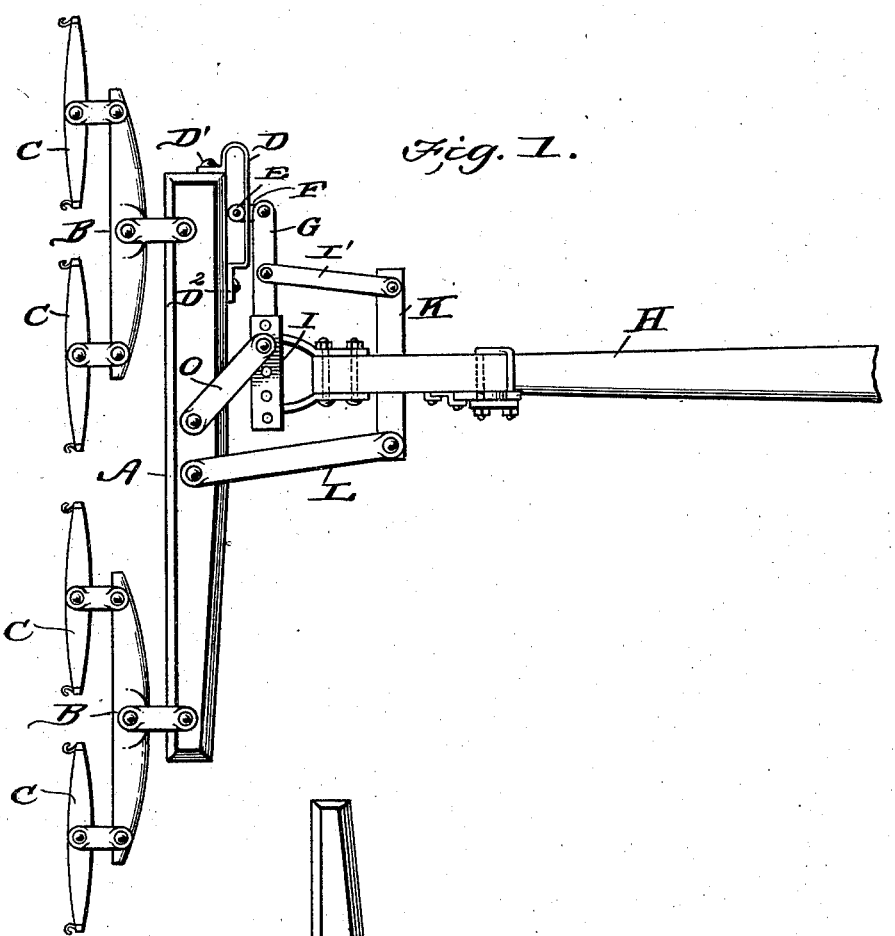
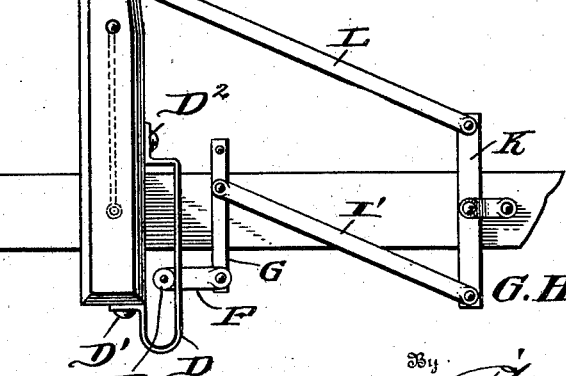

GEORGE H. KRUEGER, OF HANCOCK, IOWA.

DRAFT-EQUALIZER.

SPECIFICATION forming part of Letters Patent No. 686,309, dated November 12, 1901.

Application filed July 6, 1901. Serial No. 67,320. (No model.)

*To all whom it may concern:*

Be it known that I, GEORGE H. KRUEGER, a citizen of the United States, residing at Hancock, in the county of Pottawattamie and State of Iowa, have invented a new and useful Draft-Equalizer, of which the following is a specification.

This invention is an improved construction of draft-equalizer, the object being to provide an exceedingly cheap, simple, and durable construction of equalizer, which can be applied to plows, harvesters, and binders or any other machine requiring an even draft.

With these objects in view the invention consists in the peculiar construction of the various parts and in their novel combination or arrangement, all of which will be fully described hereinafter, and pointed out in the claims.

In the drawings forming part of this specification, Figure 1 is a plan view showing the manner of using my invention in connection with a plow-beam. Fig. 2 is a similar view showing the application of the invention to the draft-beam of a binder.

In carrying out my invention I employ an evener A, to which are pivoted the doubletrees B, said doubletrees carrying the whiffletrees C. The evener A has a metallic stirrup D arranged at one end, said stirrup being preferably constructed of scrap iron or steel fastened at one end to the end of the evener-bar, as shown at D', the opposite end D² being fastened to the rear side of the evener, as most clearly illustrated in Figs. 1 and 2.

Working in the stirrup D is a roller E, which is arranged upon the forward end of a link F, the rear end of said link being pivotally connected to a bar G, said bar being rigidly secured to the plow or harvester beam H. In Fig. 1 this bar G is rigidly secured to the clevis I, while in Fig. 2 it is secured direct to the beam.

A rearwardly-extending bar I' is pivotally connected to the bar G, said bar I' being pivotally connected at its rear end to a lever K, the opposite end of said lever having a bar L pivotally connected thereto, the forward end of said bar L being pivotally connected to the evener A.

It will thus be seen that I provide an exceedingly cheap, simple, and durable construction of draft-equalizer, which can be quickly and easily applied to a plow or harvester beam without altering the said beam in the least.

Having thus fully described my invention, what I claim as new, and desire to secure by Letters Patent, is—

1. In a draft-equalizer, the combination with an evener having a stirrup arranged at one end, of a roller traveling in the said stirrup and connected to a link, said link being connected to a bar which in turn is pivotally connected to a lever, the opposite end of said lever having a bar connecting it with the evener, substantially as shown and described.

2. In a draft-equalizer, the combination with the evener, of a stirrup arranged at one end, a roller adapted to travel in the stirrup, said roller being carried by a bar pivotally attached to a bar rigidly connected to the beam, a lever pivoted to the said beam, and the bars connected to the opposite end of said lever, one of said bars being connected to the evener and the other bar to the bar which is rigidly attached to the beam, substantially as described.

3. In a draft-equalizer, the combination with an evener, of a stirrup arranged at one end, a beam having a clevis at its forward end, a bar attached to said clevis and having a link pivoted to its free end, said link carrying a roller adapted to travel in the stirrup, a link pivotally connecting the evener to the clevis at the forward end of the beam, a clevis pivotally supported beneath the beam adjacent to its forward end and having a link attached thereto, a lever pivoted to the said link, said lever having a bar pivotally connected to its opposite end, one of said bars being pivotally connected at its forward end to the evener, the other bar being attached to the bar which is rigidly secured to the front clevis, substantially as shown and described.

GEORGE H. KRUEGER.

Witnesses:
WALTER REINEKE,
OTTO A. KRUEGER.